United States Patent [19]

Lamb et al.

[11] 3,933,272

[45] Jan. 20, 1976

[54] APPARATUS FOR DISPENSING LIQUIDS

[75] Inventors: Norman C. Lamb, Ralston; Harvey T. Shank, Papillion, both of Nebr.

[73] Assignee: Stauffer Chemical Company, Westport, Conn.

[22] Filed: Oct. 25, 1973

[21] Appl. No.: 410,008

[52] U.S. Cl. ............ 222/1; 222/46; 222/54; 222/109; 222/440; 73/429
[51] Int. Cl.² ............................ G01F 11/28
[58] Field of Search ......... 222/437, 438, 440, 457, 222/54, 23, 1, 46, 109; 73/223, 429

[56] References Cited
UNITED STATES PATENTS

| 1,244,585 | 10/1917 | Case ............... 222/457 X |
| 1,671,542 | 5/1928 | Perks ............... 222/440 |
| 1,683,337 | 9/1928 | Ernest et al. ......... 222/440 X |
| 2,044,866 | 6/1936 | Williams et al. ....... 222/54 X |
| 2,767,960 | 10/1956 | Fast ................. 222/457 X |
| 2,836,066 | 5/1958 | Brown ............... 73/223 |
| 3,145,881 | 8/1964 | Moore et al. ......... 222/440 X |
| 3,827,610 | 8/1974 | Stiefel .............. 73/429 |

FOREIGN PATENTS OR APPLICATIONS

605,565  2/1926  France ................. 222/440

*Primary Examiner*—Robert B. Reeves
*Assistant Examiner*—Frederick R. Handren

[57] ABSTRACT

This invention is a method and apparatus for dispensing a predetermined weight of liquid. The apparatus comprises a calibrated vessel having an elongated tubular section in open communication with the top of the vessel, means to fill the vessel to a level in the elongated tubular section, a displacement means which provides an area of reduced cross section at the liquid level in the tubular section, means to monitor the temperature of the liquid, means to adjust the position of the displacement means in response to temperature changes of the liquid and means to dispense the liquid. The apparatus can dispense a predetermined weight of liquid over a broad temperature range. The method comprises the steps necessary to dispense the predetermined weight of liquid.

17 Claims, 4 Drawing Figures

APPARATUS FOR DISPENSING LIQUIDS

BACKGROUND OF THE INVENTION

This invention is an apparatus and method useful for dispensing a predetermined weight of liquid. The invention is particularly useful in an apparatus for rapidly filling containers to a predetermined weight with a liquid which is obtained at variable temperatures throughout the year. The invention finds use in an apparatus for rapidly filling containers with expensive liquids.

Large amounts of liquids are sold by weight. However, it is much easier to dispense liquid by volumetric measurement. If the temperature of the liquid is not considered, large deviations in the weight of liquid contained in a given volume occur. For example, the weight of five gallons of an organic liquid can vary as much as 1 to 1½ pounds over a temperature range of about 100F°.

To accurately fill containers with a given weight of liquid, the containers are usually filled by weight. To fill a container by weight, the container must first be tare weighed. The container is then filled a final weight which is a total weight of the liquid and the container. In a filling operation on an assembly line, the total weight of the liquid and container is variable since the weight of the individual container varies. To accommodate the variable weight of the filled container, automatic liquid filling on a weight basis requires an extremely complex apparatus. Typical apparatuses for filling containers by weight are disclosed in U.S. Pat. No. 3,100,584, U.S. Pat. No. 3,162,258 and U.S. Pat. No. 3,335,807.

Attempts have been made to provide a means for dispensing a predetermined weight of liquid by volumetric measurement by compensating for the change in temperature of the liquid by changing the volume of the container in response to the temperature of the liquid. Apparatuses as disclosed in U.S. Pat. No. 2,044,866 and U.S. Pat. No. 2,063,892 are typical. The apparatuses do not dispense a predetermined weight of material with accuracy since they attempt to control a level over a large cross section. Small inaccuracies in the temperature compensation or level control result in large errors in the weight of materials dispensed.

It is an object of the present invention to provide an apparatus for accurately dispensing a predetermined weight of a liquid. It is a further object of the present invention to provide an apparatus for dispensing a predetermined weight of a liquid by volumetric means. It is a further object of the present invention to provide an apparatus for accurately dispensing a predetermined weight of liquid over a broad temperature range.

BRIEF SUMMARY OF THE INVENTION

According to the present invention, an apparatus for dispensing a predetermined weight of liquid is provided which comprises in combination, a calibrated vessel having an elongated tubular section having a cross section smaller than the cross section of the vessel in open communication with the top of the vessel, a displacement means having a cross section smaller than the cross section of the tubular section over at least a portion of its length and movable at least partly within the elongated tubular section to provide an area of reduced cross section smaller than the cross section of the tubular section. The vessel is calibrated so that the level of a predetermined weight of liquid at the highest operating temperature rises to a level in the tubular section in the area of the reduced cross section provided by the displacement means. The displacement means is of sufficient volume so that its insertion into the liquid will cause the level of the predetermined weight of the liquid at the lowest operating temperature to rise to the same level as the predetermined weight of liquid at the highest operating temperature. Means are provided to fill the calibrated vessel to a predetermined level, to monitor the temperature of the liquid, to adjust the position of the displacement means in response to the temperature of the liquid whereby a constant weight of liquid can be obtained and means to discharge the liquid from the calibrated vessel.

Figure 1:
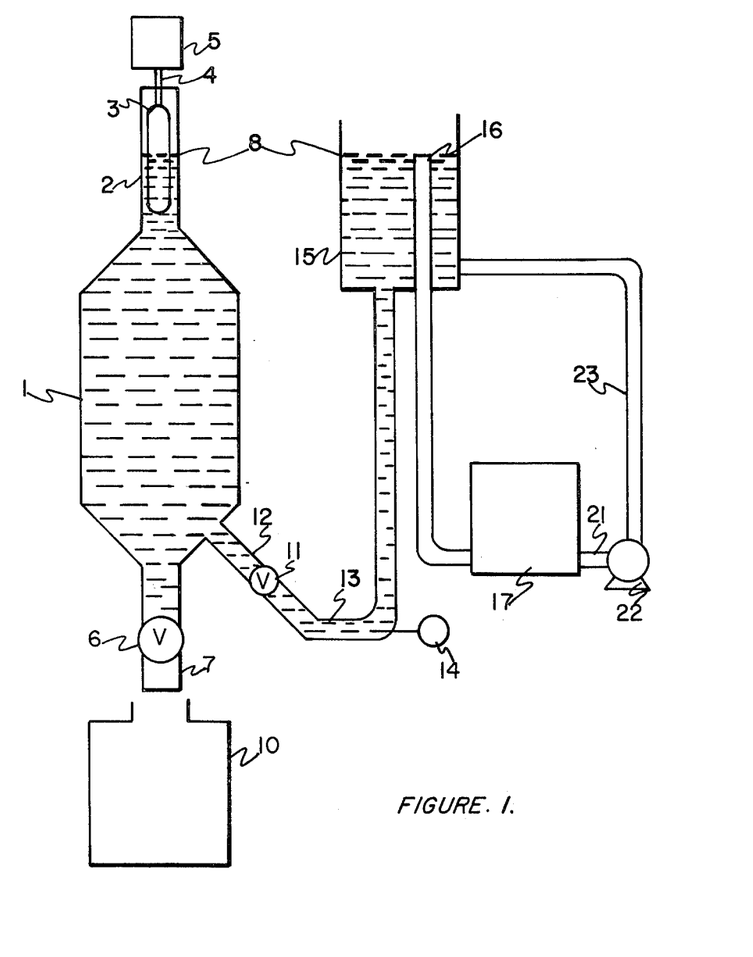
FIG. 1 is a diagrammatic representation of the apparatus of the present invention.

FIG. 1 shows calibrated vessel 1 having elongated tubular section 2 in open communication with the top of the vessel. Displacement means 3 is shown within the tubular section. The volume of calibrated vessel 1 and tubular section 2 are such that the liquid rises to the level 8 when the vessel contains the desired weight of material at the highest operating temperature. The displacement means 3 should be inserted at the level 8 at all temperatures in the calibrated temperature range. The displacement means provides a level 8 in which only a small amount of material is involved at the level due to the relatively small area presented between the displacement means and the wall of the tubular section. Positioning rod 4 attached to displacement means 3 engages positioning means 5. Positioning means 5 is utilized to position displacement means 3 in response to the temperature of the liquid. The liquid temperature is measured by temperature monitoring means 14.

In operation, valve 11 in line 13 from constant level tank 15 opens, allowing the liquid to fill calibrated vessel 1 through line 12. Valve 11 is open for a sufficient length of time to allow the level in reduced cross section of elongated tubular section 2 to reach level 8 which is the level in constant level tank 15. When the level in the calibrated vessel has reached 8, valve 11 is closed and valve 6 opens and the liquid is dispensed to container 10 through line 7. When the liquid has drained from calibrated vessel 1 and tubular section 2 through valve 6, valve 6 closes and valve 11 opens to start the cycle again.

Calibrated vessel 1 is shown as a cylindrical vessel with conical top and bottom sections. Vessels of this configuration can be readily fabricated in the capacities required. Other configurations are suitable as long as the measured volume of material can be readily dispensed or drained from the vessel.

The tubular section 2 can be of any convenient size. The cross sectional area of the tubular section should have some relationship to the volume of the liquid to be dispensed. Temperature compensation is achieved by positioning the displacement means 3 which passes at least partially through the tubular section. The accuracy of the temperature compensation is controlled by the cross sectional area of the displacement means. If the displacement means 3 within elongated tubular section 2 is of large cross section, a small change in position of the diplacement means 3 provides a large change in volume of the liquid to be dispensed. If the elongated tubular section 2 is of small cross sectional area, a relatively long displacement means may be necessary to provide the temperature compensation required over a broad temperature range. Depending upon the accuracy of measurement required and the temperature range, cylindrical tubular sections of from about 1½ to about 5 inches inside diameter have been found suitable and readily operable for dispensing liquid volumes of about 5 gallons.

The tubular section need not be long. It is only necessary that the level of the liquid rise to a point in the tubular section when the required weight of liquid is contained in the calibrated vessel. The tubular section can be any convenient length to prevent splashing of the liquid as the vessel is filled, or to enclose the displacement means.

The displacement means is positioned within the tubular section in such a manner that the free cross sectional area of the tubular section at the level of the liquid in the tubular section is reduced. The reduced free cross sectional area at the level of the liquid in the tubular section aids in increasing the accuracy of the amount of liquid dispensed. As the free cross sectional area at the liquid level is reduced, the error in the amount of liquid dispensed due to variations in the level of the liquid is reduced. Free cross sectional area is the open or unobstructed area within the tubular section. The free cross sectional area is usually from about 2 to about 45% of the area of the tubular section.

Ideally, the free area should be as small as possible commensurate with the need for venting, movement of the displacement means within the tubular section and any capillary effects which can occur as the distance between the outside of the displacement means and the inside of the tubular section decreases. Sufficient free area should be provided to enable adequate venting of the vessel to occur, and to permit the displacement means to move freely in the elongated tubular section.

The displacement means can be any suitable shape, but is preferably of the same cross sectional shape as the elongated tubular section. A circular cross section displacement means can be readily fabricated within close tolerances and is easily adapted to provide a small free area within a circular cylindrical elongated tubular section.

It is not required that the displacement means float in the liquid. In fact, it is preferred that the displacement means be of sufficient density to sink into the liquid at least over the volume to be displaced.

In operation, the displacement means' location is not limited to the tubular section but can extend into the calibrated vessel. It is only necessary that the displacement means penetrate the liquid level in the tubular section.

Displacement positioning means 5 can be a mechanical mover which is operated by hand to position the displacement means 3 at a particular position in relation to the temperature of the liquid to be dispensed.

Figure 2:
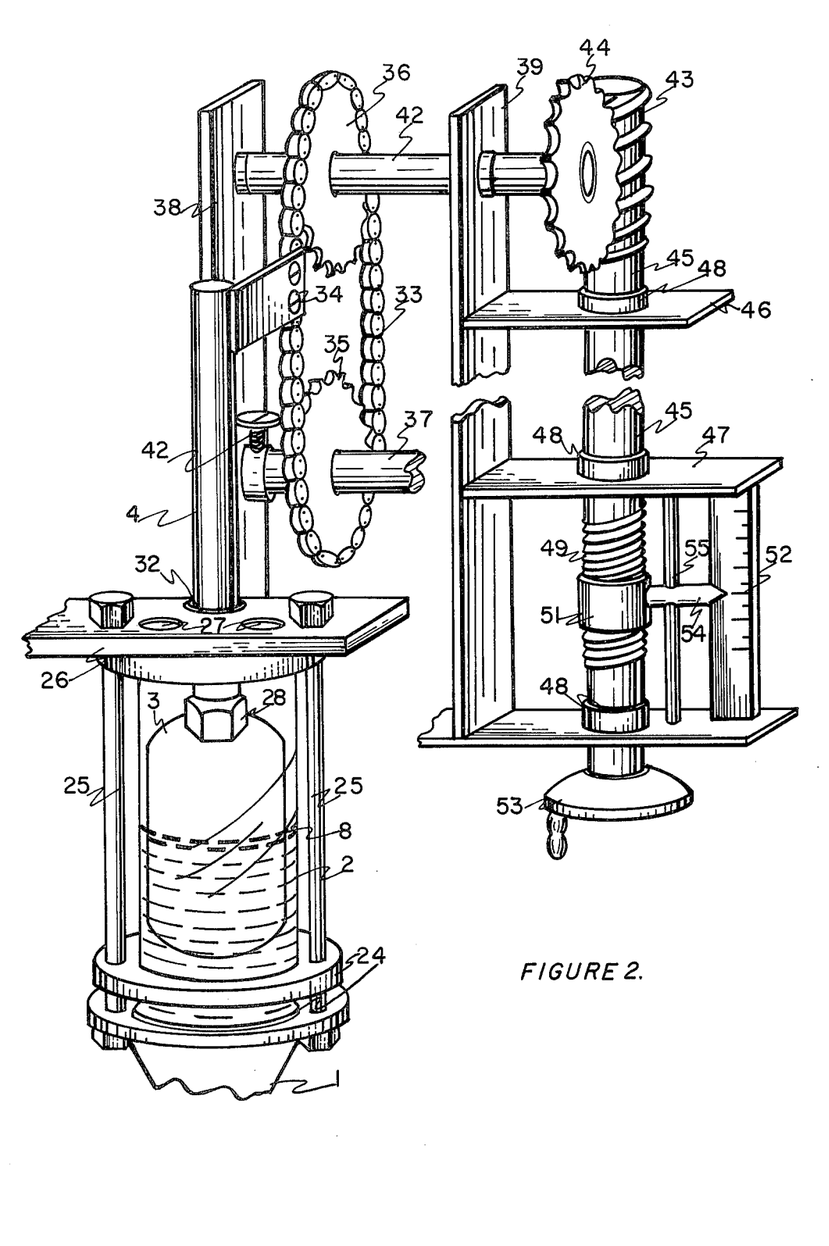
FIG. 2 is a drawing in perspective of the tubular section, the displacement means and means for adjusting the position of the displacement means.

An embodiment of a positioning means operated by hand in response to the temperature is shown in FIG. 2.

The displacement means can also be positioned automatically using proportional controllers, bidirectional motors which operate positioning means, position indicators and other known electrical, hydraulic, pneumatic or mechanical components.

As the temperature of the liquid changes, temperature monitoring means 14 in the liquid in line 13 indicates that a temperature change has occurred. The position of displacement means 3 in calibrated vessel 1 is changed to a position corresponding to the temperature by positioning means 5. If the temperature drops, more liquid must be displaced to reach the level of the required weight of liquid at 8. As the temperature increases, the displacement means must be withdrawn to provide the required weight of liquid when the vessel is filled to level 8.

As will be noted from the drawing, the area between the wall of elongated tubular section 2 and the outside of displacement means 3 can be relatively small. As an example, if the free area between the inside of the tubular section and the outside of the displacement means is one-half square inch, the level 8 attained in the calibrated vessel can vary plus or minus one inch from the required level and introduce only a volumetric error of one-half cubic inch of material.

It is important that means be provided to fill the calibrated vessel and the tubular section to the same level for each filling. As shown in FIG. 1, the level in the calibrated vessel is brought to level 8 by means of opening valve 11 in line 13 from constant level tank 15. The calibrated vessel is then permitted to reach the same level as that in tank 15. The level in tank 15 is maintained constant by pumping from storage tank 17 through line 21, pump 22 and line 23 and overflowing back to storage tank 17 through line 16. The volume of constant level tank 15 is preferably large in relation to the volume of the calibrated vessel.

The temperature of the liquid entering the calibrated vessel is monitored by temperature monitoring means 14. The displacement means 3 is positioned by displacement means positioner 5 through positioning rod linkage 4. The displacement means 3 is positioned in relation to the temperature of the liquid.

When calibrated vessel 1 has been filled to level 8, valve 11 in line 13 closes and valve 6 opens emptying the contents of calibrated vessel 1 through line 7 into container 10.

The apparatus of the present invention is particularly useful for filling relatively large containers, i.e., containers from about one quart to about 55 gallon capacity. It is particularly useful for filling one gallon, two and one-half gallon, five gallon, and fifty-five gallon containers.

Calibrated vessel 1 can be precisely calibrated so that an error of as little as one quarter ounce in 50 pounds of material can be consistently dispensed. The apparatus is particularly useful for dispensing relatively free flowing liquids and liquids which are sensitive to volumetric changes due to relatively small changes in temperature. The apparatus is not suitable for dispensing highly viscous materials which do not flow readily.

FIG. 2 illustrates an embodiment of the displacement means 3, tubular section 2, and positioning means 5 shown in FIG. 1.

Tubular section 2 is a glass pipe sealably connected to the conical top of metal vessel 1 by flange and gasket 24. Displacement means 3 is a closed circular cylinder fabricated from metal pipe and welded pipe caps. The displacement means reduces the cross sectional area within tubular section 2 to provide an area of free space of about three-fourths of one square inch to provide for easy movement of displacement means 3 and for venting of vessel 1 and tubular section 2 during filling. Tubular section 2 can be advantageously fabricated from glass pipe which provides operating personnel with an opportunity to visually determine that the vessel is being filled to the required level. The tubular section is connected to vessel 1 by means of support rods 25 having bolt means to provide a liquid tight connection with vessel 1. Top plate 26 contains vent opening 27 to permit gases to readily pass from the vessel.

Positioning rod 4 is attached to displacement means 3 by thread means and lock nut 28 which enter the top of displacement means 3. Positioning rod 4 passes through top plate 26 through opening 32 which is sufficiently large to provide easy movement of positioning rod 4. Opening 32 can be sufficiently large to provide the gas venting area in top plate 26.

Positioning rod 4 is attached to chain 33 through connecting plate 34. Chain 33 is supported on gears 35 and 36. Gear 35 is mounted on shaft 37 which is supported by support members 38 and 39.

Chain tightening means 40 is mounted on support member 38, and is used to remove slack from chain 33 so as to maintain a responsive relationship between movement of drive gear 36 on shaft 42 and displacement means 3.

Shaft 42 is rotated by action of worm 43 on drive shaft 45 against gear 44. Drive shaft 45 is supported by support means 46 and 47. Drive shaft 45 is supported by collars 48 which maintain screw section 49 and indicator 51 in calibrated to temperature scale 52.

Drive shaft 45 is rotated by crank handle 53. Pointer 54 on indicator 51 is positioned in relation to temperature scale 52 by movement of indicator 51 along screw section 49 in response to rotation of drive shaft 45. Rod 55 which passes through pointer 54 aids in maintaining pointer 54 in alignment and prevents rotation of indicator 51 with rotation of drive shaft 45.

Crank handle 53 can be replaced by other drive means such as electric, pneumatic or hydraulic bidirectional movers.

In operation, displacement means 3 is positioned within the liquid in the calibrated vessel in response to the temperature of the liquid. The temperature of the liquid is measured. Crank handle 53 is rotated to move pointer 54 opposite the indicated temperature on calibrated temperature scale 52. Rotation of crank handle 53 rotates shaft 42 and gear 36 by action of worm gear 43 against gear 44. Rotation of gear 36 moves displacement means 3 to a position which maintains the calibrated weight of liquid in vessel 1 when it is filled to level 8 as indicated by calibrated temperature scale 52.

A different calibrated temperature scale should be provided for liquids having different coefficients of expansion. In practice, one skilled in the art knowing the characteristics of the liquid, the temperature range involved, and the accuracy required in the weight of material dispensed can determine over what ranges new calibrations may be required.

Vessel 1 is usually calibrated to dispense a predetermined weight of liquid in relation to the weight of a volumetric measure of liquid at a reference temperature. This reference temperature can be any convenient temperature or a customary reference temperature used in commerce.

Figure 3:
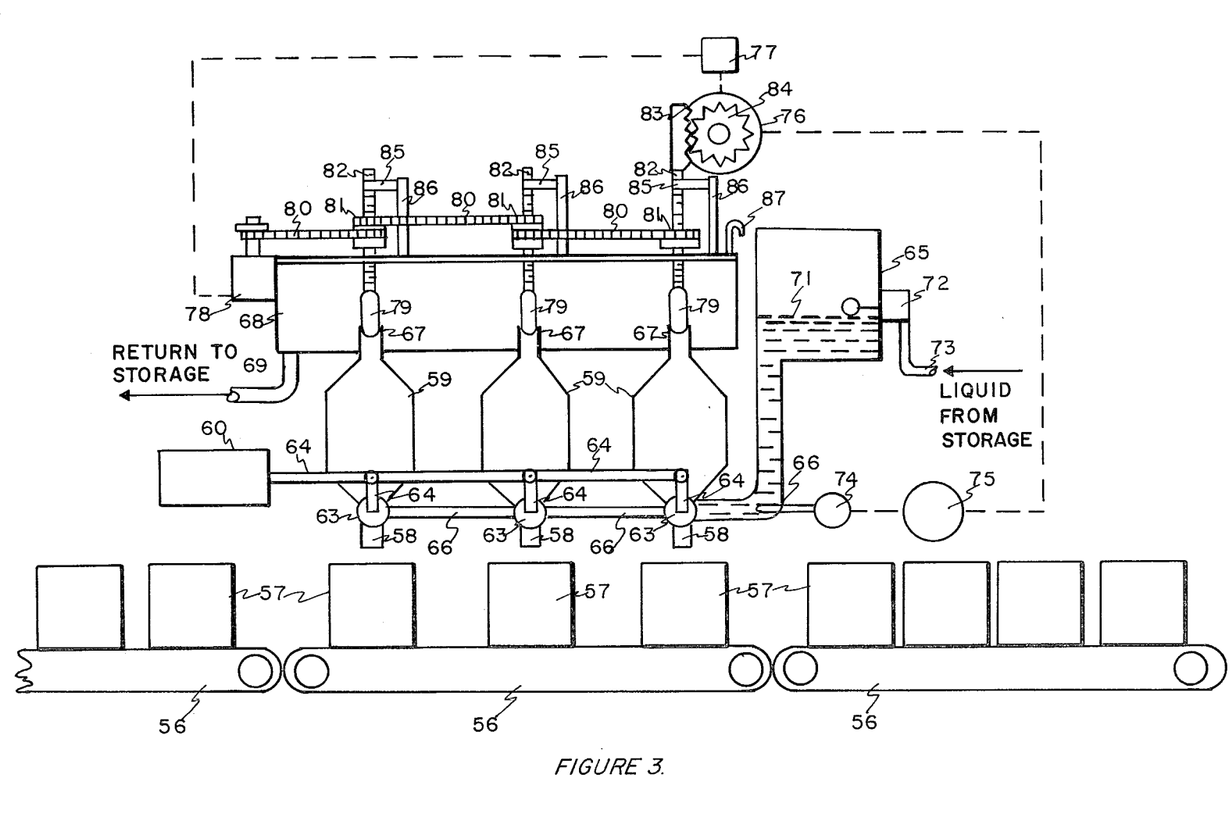
FIG. 3 is a diagrammatic representation of an apparatus utilizing the method and apparatus of the present invention to automatically dispense a predetermined weight of liquid to a multiplicity of containers.

FIG. 3 is a diagrammatic representation of an automated temperature compensated filling line. The representation illustrates a straight-through in-line filling system but the apparatus of the present invention can be adapted to carousel type automatic filling apparates. The illustration shows three calibrated vessels in the line but any convenient number can be included to provide a required number of filled containers in a set time. A five gallon container can be filled in a cycle of less than one minute.

FIG. 3 illustrates an embodiment of an apparatus using the present invention for automatically filling several containers. The embodiment illustrates an automatic method for adjusting the weight of liquid dispensed to each container in accordance with the temperature of the liquid entering the calibrated vessel.

FIG. 3 shows conveyor means 56 which automatically positions and removes containers 57 from positions below nozzles 58 on calibrated vessels 59. Conveyor means 56 can operate in cooperation with means for counting containers, indexing container fill openings beneath nozzles 58, capping containers, marking containers with code numbers to indicate lot or batch references, and stacking or packing containers for shipment. The optional functions are well known in the art and will not be explained in detail here.

Means can be provided to lift containers 57 to meet nozzles 58 or nozzles 58 can be extended to enter fill openings in container 57 to prevent loss of liquid due to splashing of the liquid during rapid filling of the containers.

In operation, valve positioner 60 moves three-way valves 63 by valve positioning linkage 64 to a position which permits the liquid to enter vessel 59 from head tank 65 through line 66. The three way valve is positioned so that the liquid cannot flow through nozzle 58 while vessel 59 is filling.

Vessel 59 fills and overflows from the top of tubular section 67. The overflow liquid is collected in the bottom of vessel 68 and returned to storage through line 69.

The liquid level 71 in head tank 65 can be higher than the level of the top of tubular sections 67 on vessels 59. The increased level insures that the liquid will overflow from the vessels when they are filled and increases the rate at which vessels 59 can be filled. Other means for overflowing vessels 59 are contemplated within the scope of the invention.

The liquid level 71 in tank 65 is maintained by float valve 72 which controls the flow of liquid in line 73 from storage tank not shown. The apparatus is particularly useful for dispensing a liquid which is stored at ambient outdoor temperature which can vary by more than 100°F. between summer and winter temperatures.

When the liquid to be dispensed reaches the top of tubular section 67, valve positioner 60 changes the position of three-way valve 63 in such a manner as to interrupt the flow of liquid from tank 65 into calibrated vessel 59, and directs the contents of vessel 59 through nozzle 58 into containers 57 which are positioned to receive the contents of calibrated vessels 59. When vessel 59 has dumped its contents into containers 57, valve positioner 60 moves three-way valve 63 into the position to fill vessel 59 from tank 65.

While vessel 59 is filling, the filled containers 57 can be moved from beneath nozzles 58 and replaced with empty containers.

The apparatus may have means for collecting any liquid dripping from nozzles 58 while filled containers 57 are removed and replaced by empty containers. Means such as a retractable tray which is automatically positioned below nozzles 58 when valve positioner 60 is not in the container fill position are suitable to prevent liquid from drippping on the filled and empty containers as they are moved past nozzles 58.

As the liquid enters calibrated vessels 59 through line 66 the temperature of the liquid is monitored by temperature sensing means 74 which can be a thermocouple, resistance bulb or the like. The temperature sensing means provides an input to proportional temperature controller 75. Proportional controller 75 compares the temperature of the liquid to a reference temperature and provides a proportional output signal to balance bridge relay 76. Balance bridge relay 76 activates motor control relay 77. Motor control relay 77 operates bidirectional motor 78 to rotate in a direction suitable for positioning displacement means 79 in tubular section 67. Displacement means 79 is positioned to compensate for the change in weight of liquid in the calibrated vessel due to the difference between the temperature of the liquid and the reference temperature.

The rotation of bidirectional motor 78 is transmitted to displacement means 79 through chain drive 80. Chain drive 80 engages chain gear 81 which rotates a threaded bushing means about threaded displacement means positioning rod 82. Movement of the positioning rod causes displacement means 79 to move in or out of tubular section 67 depending upon the direction of rotation of bidirectional motor 78.

Rack 83 attached to a positioning rod 82 moves in a vertical direction in response to movement of the displacement means 79. Rack 83 operates in cooperation with gear 84 to operate a balancing resistor which in cooperation with balancing relay 76 stops the rotation of bidirectional motor 78 when the proper position has been attained.

The balance bridge relay 76 stops the rotation of bidirectional motor 78 when the position called for by proportional controller 75 has been attained.

Positioning rod stop 85 engages a brace or cam follower 86 which prevents rotation of positioning rod when the threaded bushing is rotated about positioning rod 82.

Positioning rod 82 extends into the tubular section 67 through top of vessel 68 which is provided with means for venting 87 and means for returning overflow liquid to storage through line 69. Vessel 68 is designed to permit displacement means 79 to be operated throughout its entire calibration range.

The apparatus shown in FIG. 3 can be operated automatically on a cyclic timer. The the containers are positioned, filled and removed from the filling apparatus on a time cycle or time cycle advanced by signals received from means to indicate that empty containers are properly in place, that the calibrated vessels are filled, that the calibrated vessels have emptied and the like. Automatic liquid dispensing apparatus controls are well known in the art and will not be discussed in detail herein.

The apparatus illustrated in FIG. 3 can be operated semi-automatically wherein one or more functions in the dispensing or filling cycle can be operator controlled. As an example the dispensing or filling cycle can be started by an operator after an inspection to see that the containers are properly in place and properly indexed. The cycle could also be set up to be interrupted if a calibrated vessel was not filled, or had not emptied properly. Automatic, semiautomatic or manually operated apparatuses are intended to fall within the scope of the present invention.

Figure 4:
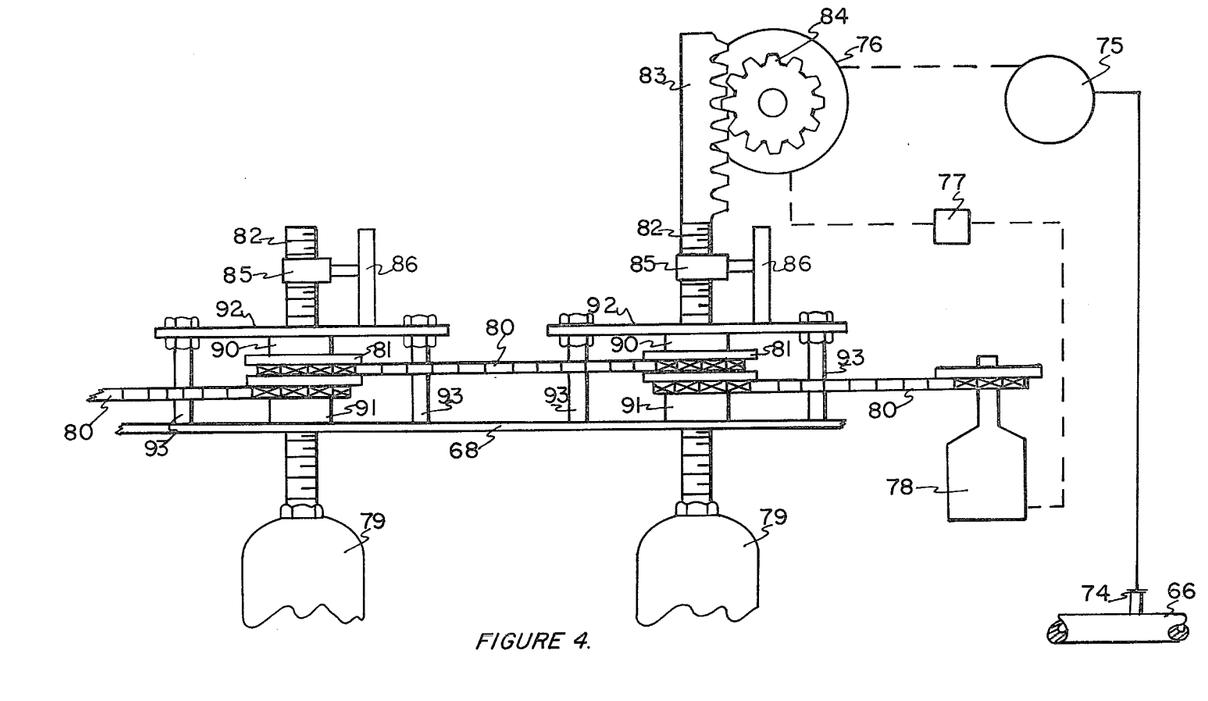
FIG. 4 is a representation of a means for adjusting the position of the displacement means in relation to the liquid temperature.

FIG. 4 is a diagrammatic illustration of the means for automatically positioning displacement means 79 in response to variations in temperature from the reference temperature.

In operation, temperature sensing means 74 senses the temperature of the liquid flowing to calibrated vessels not shown through line 66. The output of sensing means 74 which can be a resistance bulb, thermocouple or the like is provided to proportional temperature controller 75. Temperature controller 75 utilizes the output of the temperature sensing means 74 to determine the deviation of the temperature of the flowing liquid from the standard temperature.

The proportional temperature controller provides a proportional output signal which is related to the calibration for the coefficient of expansion of the liquid. The output of the temperature controller is proportional to the measured temperature difference between the reference temperature and the measured temperature.

The output of temperature controller 75 in cooperation with bridge balancing relay 76 and motor control relay 77 operate bidirectional motor 78 in the proper direction to raise or lower displacement means 79 to compensate for the temperature deviation from the reference temperature.

The actual position of the displacement means 79 is sensed by a variable resistor which is operated by a rack and a pinion arrangement. Rack 83 is connected to positioning rod 82. As the position of the displacement means is changed the movement of the rack 83 against pinion 84 activates the variable resistor which is used as a feedback signal to the balancing bridge. When the position of the displacement means has reached a position indicated by the output of the controller, the balancing bridge relay stops the turning of the bidirectional motor.

In FIG. 4 bidirectional motor 78 moves chain drive 80 which rotates double chain gear 81. Chain gear 81 has incorporated therein a threaded bushing means which rotates around the threaded shaft of positioning rod 82. Rotation of positioning rod 82 is prevented by positioning rod stop 85 which slideably engages cam follower or support 86 to prevent rotation of the positioning rod 82.

The chain gears 81 are supported by bearings 90 and 91 on top vessel 68. The assemblies are supported by support rods 93 and support plate 92.

Chain tightening gears not shown can be incorporated into the system to remove slack from chain drive 80 to make the system responsive to small movements of bidirectional motor 78 and to apply an equal amount of rotation to several drive gears operating in series.

As shown chain gear 81 is a double gear and is valuable in moving the displacement means 79 in more than one vessel. Other means for positioning displacement means 79 are also contemplated within the scope of the invention. Moving means such as the chain drives shown in FIG. 2 and worm and gear means in which one or more worm gears, on a common shaft, are operated by the moving means against a gear which rotates a threaded means about a threaded positioning rod, are useful in practice of the present invention. In general, the positioning means should be designed so that small changes in the position of the displacement means can be accurately made.

Modifications to the embodiments of the invention disclosed herein will be obvious to one skilled in the art and are intended to fall within the scope of this invention.

What is claimed is:

1. An apparatus for dispensing a predetermined weight of liquid which comprises in combination a calibrated vessel having an elongated tubular section of reduced cross section in open communication with the top of the vessel, a displacement means of cross section smaller than the cross section of the tubular section, moveable therein and providing a free area between the displacement means and the tubular section, said displacement means at least partially within the tubular section; said vessel calibrated so that the level of the predetermined weight of liquid at the highest operating temperature rises into the tubular section of reduced cross section, said displacement means being of sufficient volume that by insertion into the liquid the level of the predetermined weight of liquid at the lowest operating temperature rises into the free area between the tubular section and the displacement means to the same level as the predetermined weight of liquid at the highest operating temperature, means in communication with the calibrated vessel to fill the calibrated vessel to the level of the predetermined weight of liquid, means to discharge the liquid from the calibrated vessel, means to monitor the temperature of the liquid and means to adjust the position of the displacement means in response to the temperature of the liquid whereby a predetermined weight of liquid can be dispensed.

2. The apparatus of claim 1 wherein the means for filling the calibrated vessel to the level of a predetermined weight of liquid comprises a constant level tank.

3. The apparatus of claim 1 wherein the means for filling the calibrated vessel to the level of a predetermined weight of liquid comprises a tubular section terminated at the level of the predetermined weight of liquid and means in communication with the calibrated vessel to overflow liquid from the tubular section.

4. The apparatus of claim 1 wherein the free area of the tubular section is between about 2 and about 45% of the cross sectional area of the tubular section whereby the effect of variation of level on the weight of liquid dispensed is substantially reduced.

5. The apparatus of claim 1 wherein the means for adjusting the position of the displacement means is a manual adjustment means.

6. The apparatus of claim 5 wherein the means for adjusting the position of the displacement means comprises a manually rotated drive shaft and worm drive, the worm drive is connected to a shaft having disposed thereon one or more drive chains connected to displacement means positioning rods whereby the position of the displacement means can be adjusted.

7. The apparatus of claim 6 wherein said manually rotated drive shaft operates in cooperation with a calibration means.

8. The apparatus of claim 6 wherein the drive shaft is rotated automatically in response to the temperature change of the liquid.

9. The apparatus of claim 1 wherein the means for adjusting the position of the displacement means comprises a manually rotated drive shaft having disposed thereon a chain gear, said chain gear engaging a chain which engages a second chain gear which rotates a threaded means about a threaded displacement means connecting rod whereby the displacement means is moved to compensate for temperature changes of the liquid.

10. The apparatus of claim 9 wherein the drive shaft is rotated automatically in response to the temperature changes of the liquid.

11. In an automatic apparatus for dispensing a predetermined weight of liquid into containers, the improvement which comprises in combination a calibrated vessel having an elongated tubular section of reduced cross section in open communication with the top of the vessel, a displacement means of cross section smaller than the cross section of the tubular section, moveable therein and providing a free area between the displacement means and the tubular section said displacement means at least partially within the tubular section said vessel calibrated so that the level of the predetermined weight of liquid at the highest operating temperature rises into the tubular section of reduced cross section, said displacement means being of sufficient volume that by insertion into the liquid the level of the predetermined weight of liquid at the lowest operating temperature rises into the free area between the tubular section and the displacement means to the same level as the predetermined weight of liquid at the highest operating temperatures, means in communication with the calibrated vessel to fill the calibrated vessel to the level of the predetermined weight of liquid, means to discharge the liquid from the calibrated vessel, means to monitor the temperature of the liquid and means to adjust the position of the displacement means in response to the temperature of the liquid whereby a constant weight of liquid can be dispensed.

12. The apparatus of claim 11 wherein the means for adjusting the position of the displacement means in response to changes in the temperature of the liquid is an automatic means.

13. The apparatus of claim 12 wherein the means for adjusting the position of the displacement means in response to changes in temperature of the liquid comprises a temperature sensing means to provide an output in relation to the temperature of the liquid, means to compare the output from the temperature sensing means to a reference temperature, said comparison means providing an output in calibrated relation to the difference between the liquid temperature and the reference temperature, said output from said comparison means provided to means which adjusts the position of the displacement means.

14. In a method for volumetrically dispensing a predetermined weight of liquid at variable temperatures, wherein a displacement means is positioned in a calibrated vessel in a relation to the temperature of the liquid, the improvement which comprises monitoring the temperature of the liquid, positioning a displacement means in the liquid in the calibrated liquid dispensing vessel through a tubular section of reduced cross section in open communication with the main body of the vessel, the cross section of said displacement means being smaller than the cross section of the tubular section to permit passage of the liquid between the displacement means and the tubular section, wherein the position of the displacement means in the calibrated vessel is determined by the temperature of the liquid; filling the calibrated liquid dispensing vessel to a predetermined level in the reduced cross section between the displacement means and the tubular section with the liquid whereby a predetermined weight of liquid is contained in the vessel for dispensing.

15. In the method of claim 14 wherein the predetermined level to which the calibrated vessel is filled is determined by equalizing levels between the calibrated liquid dispensing vessel and a constant level vessel.

16. In the method of claim 14 wherein the predetermined level is achieved by over-flowing liquid from the calibrated vessel.

17. The method of claim 14 wherein the displacement means is automatically positioned in response to the temperature of the liquid.

* * * * *